United States Patent
Freeman et al.

(10) Patent No.: US 8,144,432 B2
(45) Date of Patent: Mar. 27, 2012

(54) SINKING HEAT FROM AN INTEGRATED CIRCUIT TO AN ACTUATOR

(75) Inventors: Rick Pfahl Freeman, Northfield, MN (US); Michael H. Lennard, Lyons, CO (US); Andy M. Motzko, Delano, MN (US)

(73) Assignee: Seagate Technology LLC, Cupertino, CA (US)

( * ) Notice: Subject to any disclaimer, the term of this patent is extended or adjusted under 35 U.S.C. 154(b) by 1119 days.

(21) Appl. No.: 11/948,022

(22) Filed: Nov. 30, 2007

(65) Prior Publication Data

US 2009/0141394 A1   Jun. 4, 2009

(51) Int. Cl.
*G11B 5/55* (2006.01)
*G11B 21/08* (2006.01)

(52) U.S. Cl. .................................................. 360/264.2

(58) Field of Classification Search ............... 360/264.2, 360/265.7

See application file for complete search history.

(56) References Cited

U.S. PATENT DOCUMENTS

| | | | | |
|---|---|---|---|---|
| 5,541,788 | A * | 7/1996 | Ishida et al. | 360/98.01 |
| 5,818,667 | A | 10/1998 | Larson | |
| 5,969,901 | A | 10/1999 | Eckberg et al. | |
| 5,995,321 | A * | 11/1999 | Ishida | 360/97.01 |
| 6,166,888 | A * | 12/2000 | Tsuda et al. | 360/264.2 |
| 6,714,383 | B2 * | 3/2004 | Kado et al. | 360/244.1 |
| 6,930,861 | B2 | 8/2005 | Huha et al. | |
| 7,016,158 | B2 * | 3/2006 | Yamaoka et al. | 360/266.3 |
| 7,099,117 | B1 | 8/2006 | Subrahmanyam et al. | |
| 7,139,154 | B2 | 11/2006 | Iwahara | |
| 7,787,219 | B2 * | 8/2010 | Chan et al. | 360/265.7 |
| 2004/0201926 | A1 | 10/2004 | Hancer et al. | |
| 2005/0183589 | A1 * | 8/2005 | Salmon | 101/3.1 |
| 2005/0280948 | A1 | 12/2005 | Deguchi et al. | |
| 2006/0286717 | A1 * | 12/2006 | Solberg et al. | 438/113 |
| 2008/0088978 | A1 * | 4/2008 | Ho et al. | 360/264.2 |
| 2008/0174628 | A1 * | 7/2008 | Kubo et al. | 347/18 |

* cited by examiner

*Primary Examiner* — Jefferson Evans
(74) *Attorney, Agent, or Firm* — Mitchell K. McCarthy

(57) ABSTRACT

An actuator for selectively positioning a portion of a communication channel formed by a cable circuit having a protuberant component connected at a proximal end to a flexible base, whereby the actuator defines a heat transfer surface operably disposed in thermal conductivity with a distal surface of the protuberant component for sinking heat from the component to the actuator.

20 Claims, 5 Drawing Sheets

SINKING HEAT FROM AN INTEGRATED CIRCUIT TO AN ACTUATOR

BACKGROUND

The ongoing commercialization of data processing devices has generally resulted in successive generations of devices having ever-higher rates of functionality and interconnectivity, while being contained within ever-smaller packaging. The result has been a proliferation of data processing devices being integrated into a number of different types of devices, particularly within portable devices such as computers, cell phones, digital cameras, personal data assistants, and the like.

Higher-performance electronics in smaller and more portable packaging create interesting new challenges related to sinking heat away from components such as processors, oscillators, amplifiers, and the like. With the continued demand for data processing devices with ever higher levels of performance, there remains a continual need for improvements in the manner in which the components can be closely packaged together without adversely affecting each other. It is to the furthering of those efforts that the embodiments of the present invention are directed.

SUMMARY OF THE INVENTION

Embodiments of the present invention are generally directed to an apparatus and method associated with an actuator for selectively positioning a portion of a communication channel formed by a cable circuit having a protuberant component connected at a proximal end to a flexible base, whereby the actuator defines a heat transfer surface operably disposed in thermal conductivity with a distal surface of the protuberant component for sinking heat from the component to the actuator.

These and various other features and advantages which characterize the claimed embodiments will become apparent upon reading the following detailed description and upon reviewing the associated drawings.

DETAILED DESCRIPTION

Figure 1:
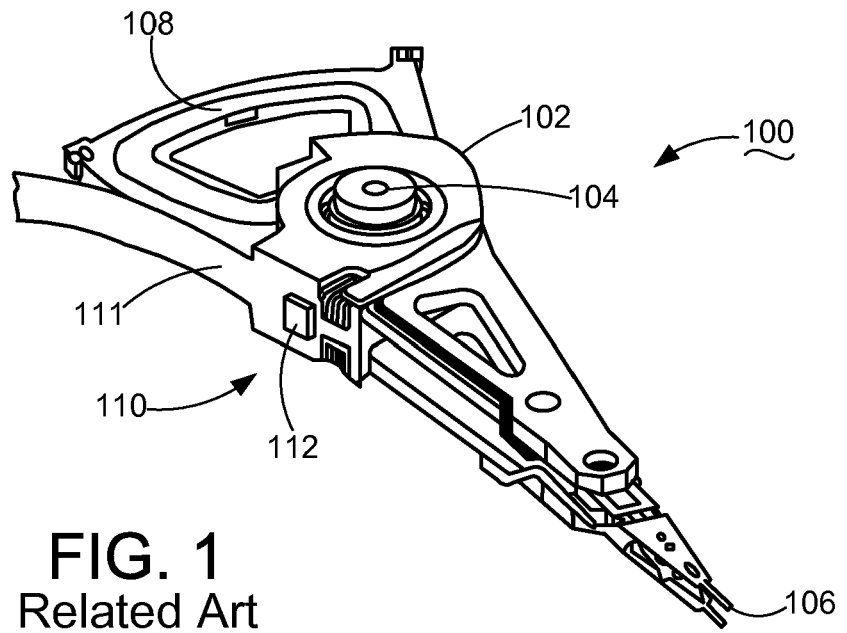
FIG. 1 is an isometric view depicting an actuator constructed in accordance with related art solutions.

FIG. 1 is an isometric view of a head stack assembly ("HSA" or "actuator") 100 that is well suited for practicing embodiments of the present invention. The actuator 100 generally has a centrally disposed body (or "eblock") 102 journalled for rotation around a bearing 104. A plurality of transducers (or "heads") 106 are disposed at distal ends of support members extending from the body 102. Also extending from the body 102 is an electrical coil 108 which acts in conjunction with magnetic poles (not shown) to form a voice coil motor. Application of a controlled current to coil 108 causes the heads 106 to be selectively positioned with respect to a target, such as to align a head 106 with a target track of a data storage medium in order to store data to and retrieve data from the track.

In this illustrative case a printed circuit cable assembly ("PCCA" or "cable circuit") 110 connects a read/write circuit 124 (FIG. 4) to a preamplifier 112 which is, in turn, connected to the heads 106. The cable circuit 110 generally has a plurality of traces and integrated components supported by a flexible dielectric base 111. The flexibility of the base 111 advantageously permits forming an expansion loop to compensate for the movement of the actuator 100. The base 111 is attached to the body 102, such as by use of a solder post 109 as shown in FIG. 5 below. The preamplifier 112 is connected at a proximal end thereof to the base 111, extending therefrom away from the body 102 and terminating at a distal end thereof.

Figure 2:
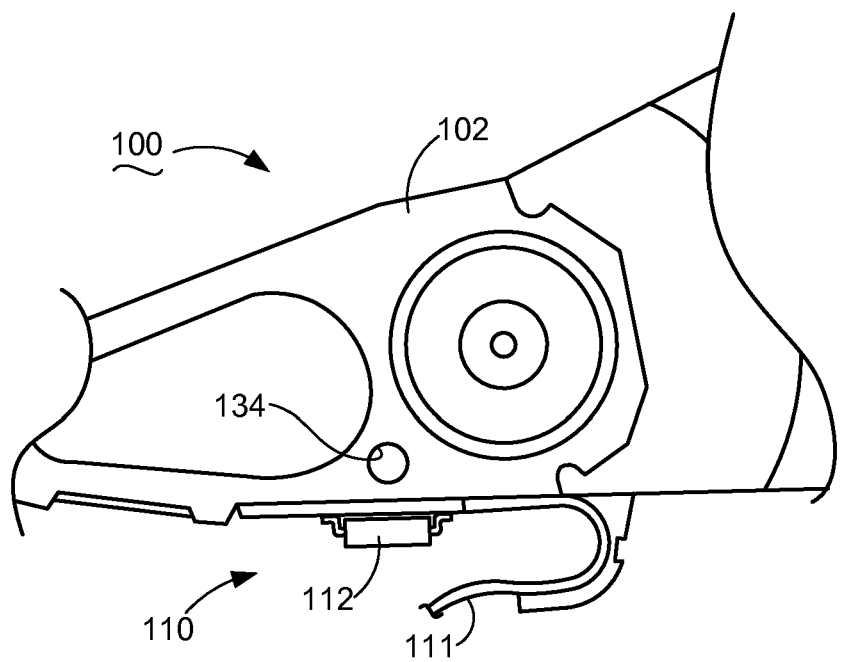
FIG. 2 is an enlarged top view of a portion of the actuator of FIG. 1.
Figure 3:
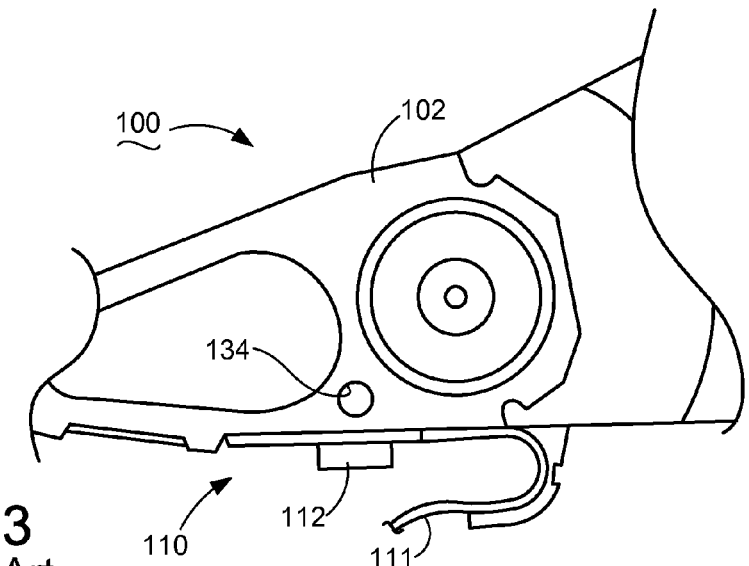
FIG. 3 is an enlarged top view of a portion of the actuator of FIG. 1.

FIG. 2 is a top view of a portion of the actuator 100, depicting illustrative embodiments of the present invention wherein the preamplifier 112 is a packaged component such as a thin-shrink small outline package ("TSSOP"). FIG. 3 is a similar view depicting other illustrative embodiments wherein the preamplifier 112 is an unpackaged bumped die. Note that in either case the body 102 can define a void, such as an aperture 134, for offsetting the weight of the cable circuit 110 in order to balance the mass of the rotating actuator 100.

Figure 4:
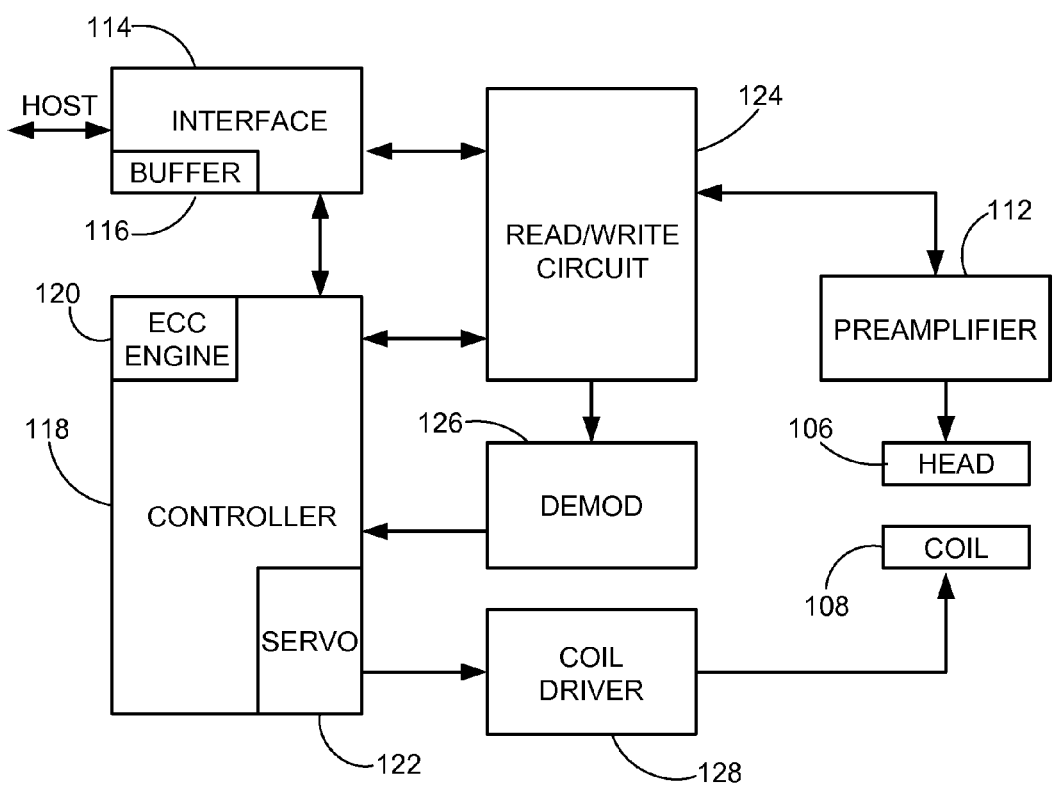
FIG. 4 is a functional block diagram depicting a data storage device employing the actuator of FIG. 1.
Figure 5:
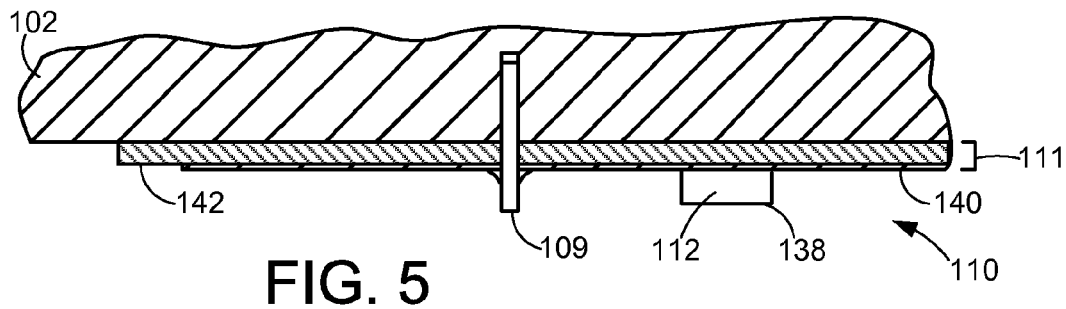
FIG. 5 is an enlarged cross sectional view depicting a portion of the actuator of FIG. 3.

FIG. 4 depicts an illustrative functional block diagram for controlling the actuator 100 (FIG. 1) during data transfer activities between the head 106 and a data storage medium. An interface circuit 114 communicates with a host device via a desired communication protocol, and includes a buffer memory space 116 ("buffer"). The buffer 116 can be a volatile or nonvolatile memory space serving as a temporary storage location for data being transferred between the host and the storage medium. Operational programming routines are further loaded into the buffer 116 for use by a top level controller 118 during device operation.

The controller 118 provides top level control for the actuator 100 (FIG. 1). The controller 118 includes various operational modules including, for example, an on-the-fly error correction code (ECC) engine 120 and a servo engine 122. Each of these modules can be realized in firmware executed by the controller 118, although these modules can also be provided in hardware, as desired.

A read/write (R/W) circuit 124 applies encoding, serialization and pre-write compensation to data to be written to the storage medium during a data write operation. The output of the R/W circuit 124 is a time-varying signal which is provided to the preamplifier 112. The preamplifier 112 in turn applies corresponding write currents to the selected head 106 to write a data pattern to the storage medium. It will be noted, as shown in FIG. 1, that the head 106, coil 108, and preamplifier 112 are preferably supported by the actuator 100.

During a subsequent read back operation, the selected head 106 transduces the data pattern from the storage medium to output a readback signal. The preamplifier 112 preamplifies and filters the readback signal, and the R/W channel 124 decodes and recovers the originally stored, encoded data from the readback signal and provides the same to the interface 114 for subsequent transfer to the host. For reference, the read/ write circuit 124, preamplifier 112, and head 106 are collectively referred to herein as a "communication channel."

Positional control of the heads 106 to enable the actuator 100 to carry out read and write operations is provided by a servo control loop including the head 106, preamplifier 112, initial stages of the R/W circuit 124, a demodulation circuit 126, the servo engine 122, a coil driver circuit 128 and the coil 108.

FIG. 5 is an enlarged partial cross sectional view of FIG. 3 that more particularly depicts the base 111 as having a polymeric layer 140, such as a polyimide, and a stiffener layer 142. Although the stiffener 142 can be made of a thermally conductive material, such as aluminum, the layer of polyimide and adhesives used to bond the polyimide create thermal impedances that effectively prevent conductive heat transfer from the preamplifier 112 to the body 102.

Figure 6:
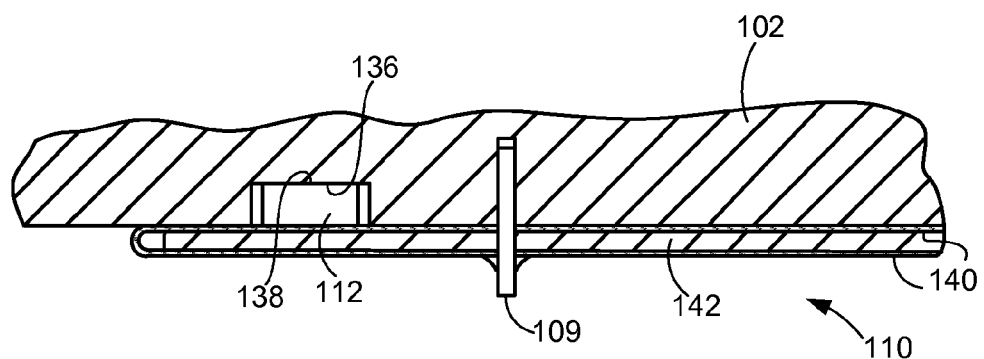
FIG. 6 is a cross sectional view similar to FIG. 5 but depicting a flipped flex construction in accordance with alternative embodiments of the present invention.

FIG. 6 depicts illustrative embodiments of the present invention whereby a modified flexible dielectric base 111 ("flipped flex") is employed, at least with respect to the preamplifier 112, in order to advantageously use the body 102 as a heat sink for the preamplifier 112. That is, in FIG. 6 the body 102 defines a heat transfer surface 136 that is disposed in a state of thermal conductivity with a distal surface 138 of the preamplifier 112. For purposes of this description and meaning of the appended claims, surfaces that are disposed in "thermal conductivity" means that they are disposed with respect to each other such that thermal energy is transferred from the preamplifier 112 by conduction.

In the illustrative embodiments of FIG. 6 the actuator heat transfer surface 136 defines a cavity in the body 102 that is sized for receivingly engaging the preamplifier distal surface 138 in a close mating engagement. It will be noted that the cavity can serve the purpose of the aperture 134 (FIGS. 2 and 3) for the purpose of balancing the actuator 100.

Figure 7:
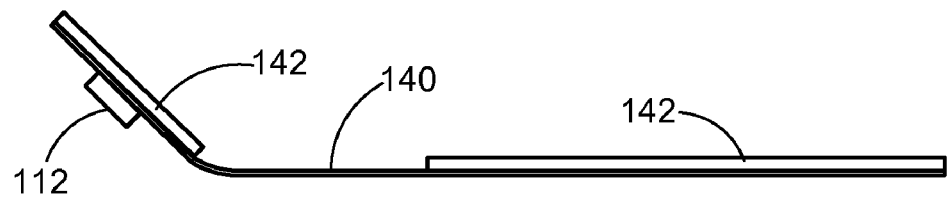
FIG. 7 depicts a manner of making the flipped flex of FIG. 6 in accordance with embodiments of the present invention.
Figure 7:
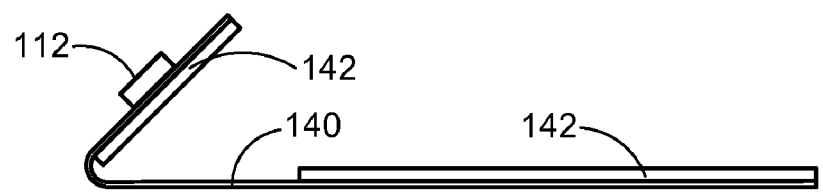
Figure 7:
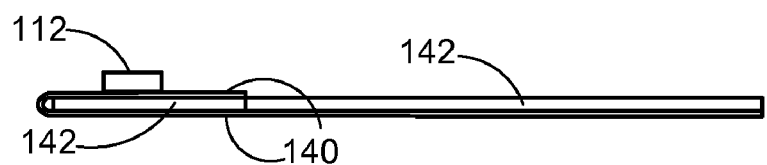

FIG. 7 depicts illustrative embodiments for making the flipped flex arrangement of FIG. 6 by providing a gap in the stiffener 142, thereby permitting the polymeric layer 140 to be folded over to sandwich the folded-over stiffener 142 between opposing layers of the polymeric layer 140.

Figure 8:
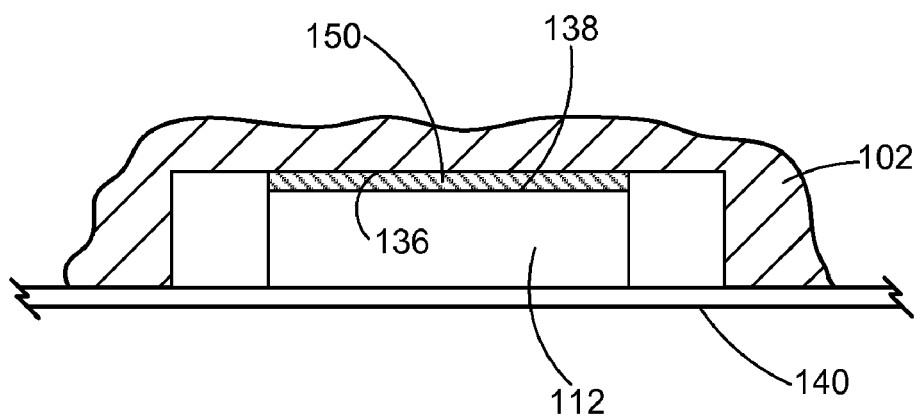
FIG. 8 is an enlarged view of a portion of FIG. 6.

FIG. 8 is an enlarged view of a portion of FIG. 6, depicting illustrative embodiments whereby a thermally conductive dielectric member 150 can be sandwiched between the actuator heat transfer surface 136 and the preamplifier distal surface 138 to provide the state of thermal conductivity therebetween, while electrically insulating the preamplifier 112 from the body 102. The dielectric member 150 can be provided as a film on the preamplifier 112 or on the body 102, or on both. For example, during experimentation it was determined that a 0.005 inch thick layer of adhesive film marketed by 3M as "8805 film" is well suited for this purpose. In alternative equivalent embodiments the dielectric member 150 can be provided as an epoxy, such as 3M's "TC-2707 epoxy". In other alternative embodiments thermal underfill can be used to bond the distal end 138 of the preamplifier to the body 102. Alternatively, a compressed member made of non-electrically conductive metal can be used alone or in combination with bonding agents in yet other illustrative embodiments.

Figure 9:
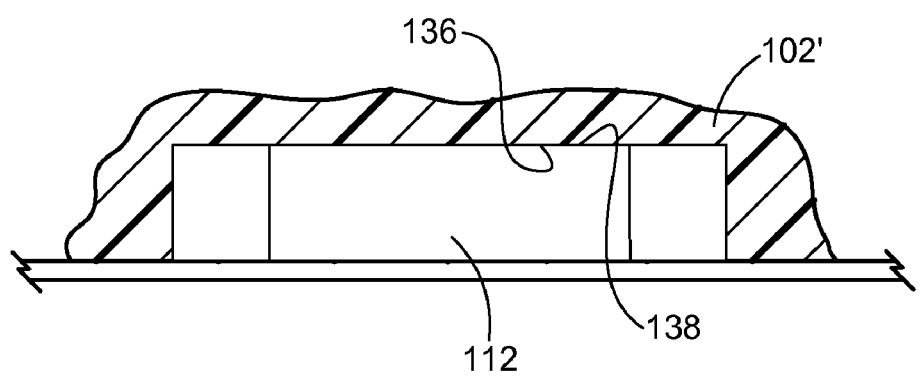
FIG. 9 is an enlarged view of a portion of FIG. 6.

FIG. 9 depicts yet other alternative embodiments of the present invention whereby the body 102' is made of a thermally conductive dielectric material, such as but not limited to a polymeric material with conductive heat transfer characteristics. In this case the cavity can be sized to receivingly engage the preamplifier distal surface 138 in direct contacting engagement with the actuator heat transfer surface 136. Although not illustrated, the packaged preamplifier 112 of FIG. 2 can be placed directly in contacting engagement between its distal surface 138 and an electrically conductive body 102.

Some embodiments of the present invention contemplate a data storage device with the actuator 100 supporting a flexible circuit 110 between the read/write circuit 124 and the transducer circuit (heads 106), and means for sinking heat from the flexible circuit 110 to the actuator 100. For purposes of this description and meaning of the appended claims the phrase "means for sinking heat" expressly includes solutions employing the structure disclosed herein and equivalents thereof for placing the distal end of a component of the flexible circuit 110 in a state of thermal conductivity with the actuator 100. For example, "means for sinking heat" contemplates the disclosed embodiments whereby a distal surface of a component in the flexible circuit 110, such as but not limited to the preamplifier 112, is disposed in thermal conductivity with the heat transfer surface 136 defined by the actuator 100. The meaning of the phrase "means for sinking heat" expressly does not include previous attempted solutions that intentionally place thermal impedance between the component and the body, such as the polyimide layer also supporting the traces. "Means for sinking heat" also does not include previous attempted solutions that rely on convection in the absence of conduction in sinking heat from a component of the flexible circuit 100.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are described in relation to an actuator for selectively positioning a control member in relation to a target, it will be appreciated by those skilled in the art that the claimed subject matter is not so limited and various other systems can utilize the present embodiments without departing from the spirit and scope of the claimed invention.

What is claimed is:

1. An actuator comprising:
    a body;
    a cable circuit connected to the body, the cable circuit having a stiffener supporting a plurality of electrical traces, a first portion of the plurality of electrical traces operably disposed between the stiffener and the body and a second portion of the plurality of electrical traces operably disposed on an opposing exposed side of the stiffener; and
    an integrated component attached to the cable circuit and extending therefrom, a distal end of the integrated component disposed directly in a thermal conductivity heat transfer relationship with the body, both the first portion and the second portion of the plurality of electrical traces electrically connected to the integrated component.

2. The actuator of claim 1 wherein an actuator heat transfer surface defines a cavity sized for receivingly engaging the distal end of the integrated component in a close mating engagement.

3. The actuator of claim 1 wherein an actuator heat transfer surface and the integrated component distal end contactingly engage a thermally conductive dielectric member operably interposed between them.

4. The actuator of claim 3 wherein the dielectric member comprises a material disposed on the distal end.

5. The actuator of claim 3 wherein the dielectric member comprises a material disposed on the heat transfer surface.

6. The actuator of claim 3 wherein the dielectric member comprises a thin film.

7. The actuator of claim 1 wherein an actuator heat transfer surface comprises a thermally conductive dielectric material.

8. The actuator of claim 1, further comprising a third portion of the plurality of electrical traces connecting the first portion of the plurality of electrical traces and the second portion of the plurality of electrical traces.

9. The actuator of claim 1 wherein the integrated component is operably interposed between the cable circuit and the actuator.

10. The actuator of claim 1 wherein the integrated component is a preamplifier connected to a transducer for storing data to a medium.

11. A method comprising:
providing an actuator body;
providing a cable circuit connected to the body, the cable circuit having a stiffener supporting a plurality of electrical traces, disposing a first portion of the plurality of electrical traces operably between the stiffener and the body and disposing a second portion of the plurality of electrical traces operably on an opposing exposed side of the stiffener;
mounting an integrated component on the cable circuit and extending the integrated component from the cable circuit;
disposing a distal end of the integrated component directly in a thermal conductivity heat transfer relationship with the body; and
providing both the first portion and the second portion of the plurality of electrical traces electrically connected to the integrated component.

12. The method of claim 11 wherein the providing an actuator body step is characterized by an actuator heat transfer surface defining a cavity sized for receivingly engaging the integrated component distal end in a close mating engagement.

13. The method of claim 11 wherein the mounting step comprises contactingly engaging an actuator heat transfer surface and the integrated component distal end against a thermally conductive dielectric member.

14. The method of claim 13 wherein the providing a cable circuit step comprises disposing the integrated component distal end with the dielectric member.

15. The method of claim 13 wherein the providing an actuator body step comprises disposing the actuator heat transfer surface with the dielectric member.

16. The method of claim 11 wherein the mounting step comprises applying a thin film of dielectric material to at least one of the integrated component distal end and an actuator heat transfer surface.

17. The method of claim 11 wherein the providing an actuator body step is characterized by an actuator formed of a thermally conductive dielectric material.

18. The method of claim 11 wherein the providing a cable circuit step comprises a third portion of the plurality of electrical traces connecting the first portion of the plurality of electrical traces and the second portion of the plurality of electrical traces.

19. The method of claim 11 wherein the mounting step comprises interposing the integrated component between the cable circuit and the actuator.

20. An actuator comprising:
a body;
a cable circuit connected to the body, the cable circuit having a stiffener supporting a plurality of electrical connectors, a first portion of the plurality of electrical connectors operably disposed between the stiffener and the body and a second portion of the plurality of electrical connectors operably disposed on an opposing exposed side of the stiffener; and
an integrated component attached to the cable circuit and extending therefrom, a distal end of the integrated component disposed directly in a thermal conductivity heat transfer relationship with the body, both the first portion and the second portion of the plurality of electrical connectors electrically connected to the integrated component.

* * * * *